No. 749,465. PATENTED JAN. 12, 1904.
W. THORPE.
PIPE AND METHOD OF JOINTING SAME.
APPLICATION FILED JUNE 10, 1903.
NO MODEL.

WITNESSES
Fred White
Thomas Wallace

INVENTOR:
William Thorpe,
By his Attorneys:

No. 749,465. Patented January 12, 1904.

UNITED STATES PATENT OFFICE.

WILLIAM THORPE, OF CHELSEA, LONDON, ENGLAND, ASSIGNOR TO FREEMAN HINES, LIMITED, OF LONDON, ENGLAND.

PIPE AND METHOD OF JOINTING SAME.

SPECIFICATION forming part of Letters Patent No. 749,465, dated January 12, 1904.

Application filed June 10, 1903. Serial No. 160,832. (No model.)

*To all whom it may concern:*

Be it known that I, WILLIAM THORPE, sanitary engineer, of 8 Tetcott road, Chelsea, London, England, have invented certain new and useful Improvements in Pipes and in Methods of Jointing the Same, of which the following is a specification.

This invention relates to an improved form of pipe and means for jointing and stoppering the same.

The object of this invention is to obtain the effective jointing of pipes whether for water, sewage, or other purposes and to secure a tight joint and true alinement of the invert.

The socket of the pipe as ordinarily made, whether in metal or earthenware, is usually much larger than the spigot and the space is filled up with cement, lead, or other suitable material.

A pipe made in accordance with my invention is provided with a snail-cam-shaped projection or collar on the spigot end of the pipe and a snail-cam-shaped projection or lining on the inside of the faucet or socket. The shape and disposition of the projections or cams would on development be that of a pair of wedges back to back, the cams being so formed and disposed that when the spigot of one pipe is placed in the socket of the other they together fill or nearly fill the space usually allowed at the joint. The inclined faces of the projections are formed with longitudinal slopes thereon inclined in opposite directions, the splay being so arranged that the operation of fixing the pipes or joints in position causes a slight endwise movement and the pipes are drawn together lengthwise in addition to the lateral wedging action obtained by the movement of the cams.

Figure 1:
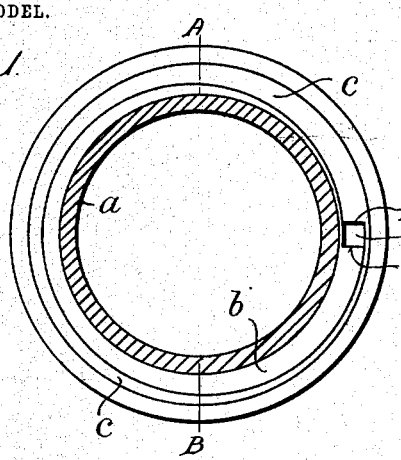
Figure 2:
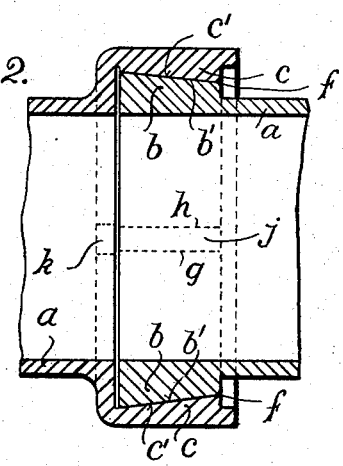
Figure 3:
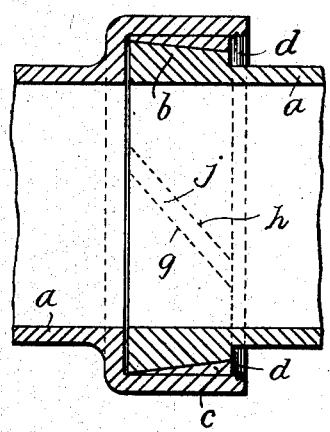
Figure 4:
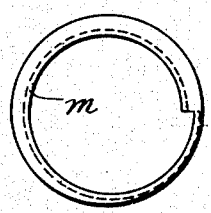
Figure 5:
Figure 6:
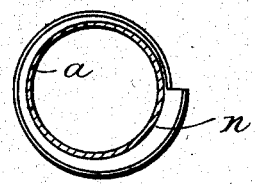
Figure 7:
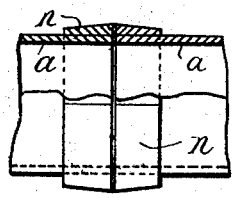

Referring now to the drawings, Figure 1 is an end elevation of a pipe jointed in accordance with one form of my invention. Fig. 2 is a sectional elevation of the same on line A B. Fig. 3 is a sectional elevation of a modified form. Figs. 4 and 5 are detail views of a collar, and Figs. 6 and 7 are detail views of a lining for use when the cam-like projections are not formed on the pipe ends.

$a$ is a pipe, $b$ a snail-cam-shaped projection formed on the spigot end thereof, and $c$ a corresponding cam-shaped projection in the socket. The said cams are provided with inclined faces, as at $b'$ $c'$. In some cases I place a groove or grooves of V shape or other form on the face of the socket, as at $d$, the socket being formed of sufficient length to project beyond the packing. In some cases the cams are made with rounded edges, as at $f$.

In use the spigot end of the pipe is inserted into the socket in such a way that the step $g$ of the cam on the spigot abuts, or nearly so, on the step $h$ of the cam on the socket and may leave a slight clearance $j$ between the two cam projections. When fitted together, the inserted pipe can only be rotated in one direction, and rotation in this direction causes one incline on the spigot end to move along the other incline in the socket, and thus causing a slight endwise movement and at the same time causing the cams to bind on one another and make a tight joint. The lateral and longitudinal inclines being slight, there is little or no tendency for the members to shift or become loose, and in practice this possibility can be prevented, as hereinafter described.

The step ends of the cam projections may be formed parallel to the center line of the pipe or may be disposed obliquely thereto. An advantage is obtained by making the steps of the cams inclined obliquely to the center line of the pipe—namely, when the one cam is inserted in the other and the parts are turned the steps slide on each other and wedge, thus obviating a gap between the steps when the parts are secured together and facilitating the insertion of the cams. The step end of the cam in the socket and that on the spigot are or may be inclined to one another when in position in order to facilitate the entrance of a wedge when inserted and driven between them for the purpose of bringing the edges or faces of the cams together. I drive the surfaces of the cams over one another by inserting a wedge of wood or other suitable material into the space $j$ between the two steps $g$ and $h$, causing the cams to coact with one another, so as to make a tight joint between the ends of the pipes. The wooden wedge can be left in place, or it may be extracted and the space filled up with a suitable stopping. The wedge may in some cases be driven through holes, such as $k$, in the sockets.

When the spigot and socket are first put together, the two pipes may be slightly out of alinement; but on turning one pipe in respect of the other the cam-like surfaces are wedged together and the two pipes are brought into alinement.

In cast-iron pipes the respective parts—viz., the collar on the spigot and the lining in the socket—can be accurately cast and when in use can be wedged into position, as before described, and, if necessary, any irregularity can be calked in the same manner as the plates of boilers. Some soft metal may be used, if desired, between the collar and lining.

In some cases where two spigot ends not having the cams cast or formed thereon have to be joined I may use a loose collar, as shown in Figs. 4 and 5, having a cam $m$ cast or formed therein, and I place around the ends of the pipe to be joined cams or wedge-shaped pieces of iron, earthenware, bitumen, or suitable material, such as $n$, Figs. 6 and 7, adapted to take the place of the cam cast or formed on the spigot.

The whole of the cams or wedges may be of bitumen or other suitable material and may be placed on the spigot and in the sockets of the pipes.

In earthenware pipes the shape varies in baking, and any irregularity can be filled up with bitumen or other suitable material.

In cases where less than a whole pipe or a bend or junction has to be inserted and joined the pipe is cut to the required length and a cam-shaped piece of bitumen or other material, as at Figs. 6 and 7, is placed round the spigot.

In applying my invention to pipes already made it would be possible to have the lining and the collar separate, as shown in Figs. 4, 5, 6, and 7.

In applying my invention to stoppers for pipes, &c., the spigot or plug is made solid, so that when placed in position a tight and efficient joint is effected.

Openings to manholes and inspection-chambers are for the purpose of this specification considered equivalent to pipes.

What I claim, and desire to secure by Letters Patent, is—

1. A pipe-joint comprising male and female snail-cams adapted to be inserted the one into the other and turned with respect to each other, the coacting faces of said cams having a longitudinal slope, whereby when the male cam is turned in the female cam their longitudinally-sloped faces jam both peripherally and longitudinally, and the pipes are drawn together, substantially as described.

2. A pipe-joint comprising a socket having a female snail-cam therein and a spigot having a male snail-cam thereon, the coacting faces of said cams having a longitudinal slope, whereby when the spigot is inserted in the socket and the parts turned with respect to each other the longitudinally-sloped faces of the cams jam both peripherally and longitudinally and the pipes are drawn together, substantially as described.

3. A pipe-joint comprising a socket having a female snail-cam therein and a lining adapted to be placed between said socket and the spigot end of a pipe and having a male snail-cam formed thereon, the coacting faces of said cams having a longitudinal slope, substantially as and for the purpose specified.

4. A pipe-joint comprising a socket having a cam-shaped projection formed therein, said cam having a longitudinal and lateral slope, a spigot having a corresponding cam-shaped projection formed thereon, a wedge disposed between the steps of said cams, a hole in the flange of the socket through which the wedge can be inserted or driven substantially as and for the purpose described.

5. A pipe-joint comprising a socket having a cam-shaped projection formed therein, said cam having a longitudinal and lateral slope, a spigot having a corresponding cam-shaped projection formed thereon, a wedge disposed between the steps of said cams, a hole in the flange of the socket through which the wedge can be inserted or driven substantially as and for the purpose described.

6. A pipe-joint comprising a socket having a female snail-cam therein, a spigot having a male snail-cam thereon, the coacting faces of said cams having a longitudinal slope, the steps of the cams being inclined obliquely to the center line of the pipe, substantially as and for the purpose specified.

7. A joint for stoppering pipes, comprising a socket having a female snail-cam therein, a spigot having a corresponding male snail-cam thereon, the coacting faces of said cams having a longitudinal slope, and a filling between the steps of the snail-cams, substantially as and for the purposes specified.

8. A pipe-joint comprising two members to be joined, said members having abutting ends, and male and female snail-cams secured the one to one of said members and the other to the other of said members, said cams having their faces longitudinally inclined, so that when said members are relatively rotated their abutting ends are forced together by said cams, and said cams simultaneously jam together peripherally, substantially as described.

In witness whereof I have hereunto signed my name in the presence of two subscribing witnesses.

WILLIAM THORPE.

Witnesses:
REGINALD EATON ELLIS,
ROBERT M. SPEARPOINT.